United States Patent
Husebo

(10) Patent No.: US 9,015,950 B2
(45) Date of Patent: Apr. 28, 2015

(54) METHOD AND DEVICE FOR LOCKING A SUPPORT RING TO A SCAFFOLDING COLUMN

(75) Inventor: Martin Husebo, Stavanger (NO)

(73) Assignee: Alustar AS (NO)

( * ) Notice: Subject to any disclaimer, the term of this patent is extended or adjusted under 35 U.S.C. 154(b) by 233 days.

(21) Appl. No.: 13/878,533

(22) PCT Filed: Nov. 4, 2011

(86) PCT No.: PCT/NO2011/000310
§ 371 (c)(1),
(2), (4) Date: Apr. 9, 2013

(87) PCT Pub. No.: WO2012/064198
PCT Pub. Date: May 18, 2012

(65) Prior Publication Data
US 2013/0212861 A1    Aug. 22, 2013

(30) Foreign Application Priority Data
Nov. 8, 2010    (NO) .................................... 20101573

(51) Int. Cl.
*E04G 7/30* (2006.01)
*E04G 7/22* (2006.01)
(Continued)

(52) U.S. Cl.
CPC ............ *B23P 19/00* (2013.01); *Y10T 29/49826* (2015.01); *E04G 7/34* (2013.01); *E04G 7/32* (2013.01); *E04G 7/22* (2013.01); *E04G 7/306* (2013.01)

(58) Field of Classification Search
CPC ........... B23P 19/00; E04G 7/22; E04G 7/306; E04G 7/32; E04G 7/34; Y10T 29/49826
USPC ......... 29/525.01, 525.11, 525.12, 897, 897.3, 29/897.31, 897.312, 897.33; 403/49, 403/374.3, 373.4; 182/186.7, 186.8
See application file for complete search history.

(56) References Cited

U.S. PATENT DOCUMENTS 3,000,656 A  *  9/1961  Hollaender .................... 403/298
3,992,118 A  *  11/1976  Siegers .......................... 403/171
(Continued)

FOREIGN PATENT DOCUMENTS

EP    0777804    * 11/1999   ................ E04G 7/30
NO    79351         8/2010
(Continued)

OTHER PUBLICATIONS

International Preliminary Report on Patentability issued in connection with PCT/NO2011/000310.
(Continued)

*Primary Examiner* — David Bryant
*Assistant Examiner* — Bayan Salone
(74) *Attorney, Agent, or Firm* — Akerman LLP

(57) ABSTRACT

A method and device for locking of a support ring (8) to a scaffolding column (1), wherein the support ring (8) is formed with a through opening (10), and wherein the support ring (8) fits in a complementary and displaceable manner onto the scaffolding column (1), and wherein the method comprises:—providing an external mantel surface of the scaffolding column (1) with a longitudinal column track (4);—providing an inner mantel (12) of the support ring (8) with a ring track (14);—displacing a support ring (8) along and around the scaffolding column (1);—positioning the column track (4) and the ring track (14) next to each other; and—displacing a thread body (22) into the column track (4) and the ring track (14) during rotation of the thread body (22) about a longitudinal axis (28) thereof, a column track depth (6) and a ring track depth (16) having a collective depth being smaller than an external thread diameter (30) of the thread body (22).

3 Claims, 3 Drawing Sheets

Figure 1:
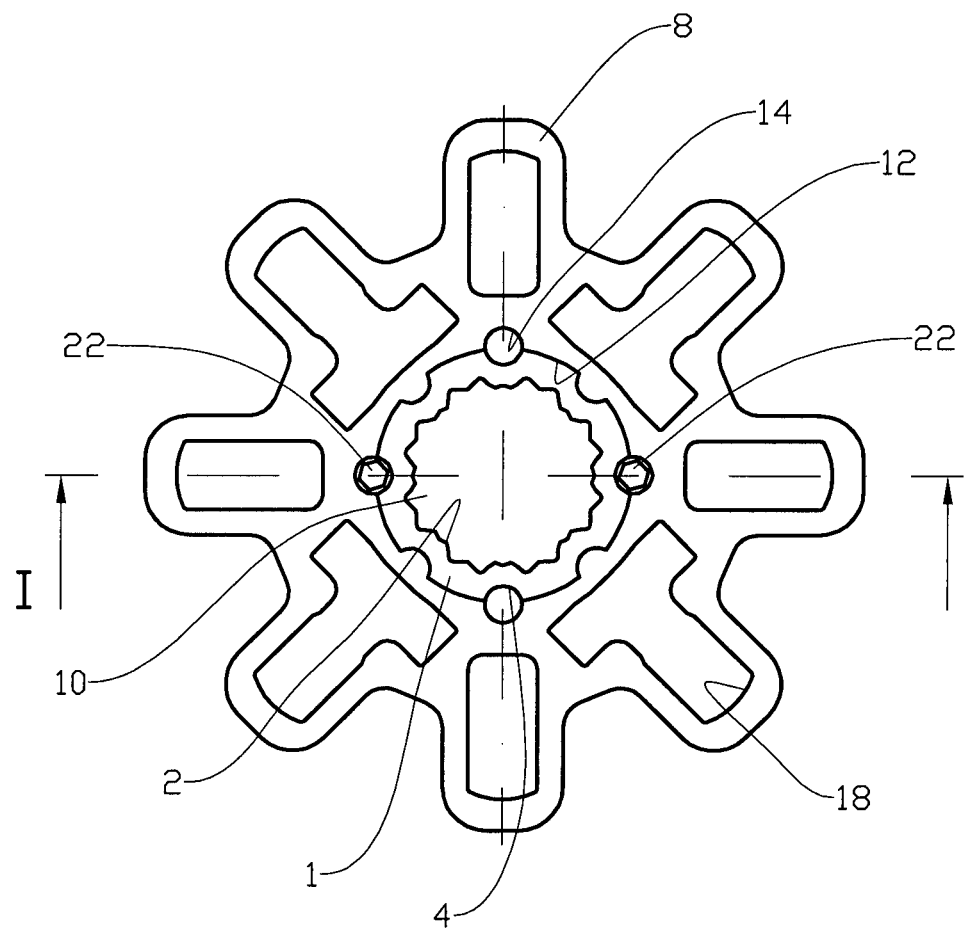

(51) Int. Cl.
*E04G 7/32* (2006.01)
*E04G 7/34* (2006.01)
*B23P 19/00* (2006.01)

(56) References Cited

U.S. PATENT DOCUMENTS

| | | | |
|---|---|---|---|
| 4,039,264 A * | 8/1977 | Sharp | 403/246 |
| 4,101,229 A * | 7/1978 | Weibull | 403/171 |
| 5,961,240 A | 10/1999 | Bobrovniczky | 403/49 |
| 6,796,454 B1 * | 9/2004 | Matthews et al. | 221/197 |
| 6,945,140 B2 * | 9/2005 | Gibbons et al. | 81/57.37 |
| 7,730,930 B2 * | 6/2010 | Malausa et al. | 160/310 |
| 7,975,803 B2 * | 7/2011 | Schwoerer | 182/178.1 |
| 8,083,192 B2 * | 12/2011 | Wells et al. | 248/218.4 |
| 8,152,404 B2 * | 4/2012 | Berg | 403/356 |
| 2005/0039580 A1 * | 2/2005 | Gibbons et al. | 81/57.37 |
| 2005/0284910 A1 * | 12/2005 | Craythorn et al. | 227/112 |
| 2009/0212062 A1 * | 8/2009 | Craythorn et al. | 221/1 |
| 2013/0333191 A1 * | 12/2013 | Wallther | 29/428 |

FOREIGN PATENT DOCUMENTS

| | | | |
|---|---|---|---|
| WO | 96/06251 A1 | 2/1996 | |
| WO | WO 9606251 A1 * | 2/1996 | E04G 7/30 |

OTHER PUBLICATIONS

International Search Report issued in connection with PCT/NO2011/000310.

* cited by examiner

I-I

A    B

METHOD AND DEVICE FOR LOCKING A SUPPORT RING TO A SCAFFOLDING COLUMN

This application is a national phase of PCT/NO2011/000310, filed Nov. 4, 2011, and claims priority to NO 20101573, filed Nov. 8, 2010, the entire contents of both of which are hereby incorporated by reference.

This invention concerns a method for locking a support ring to a scaffolding column. More particularly, it concerns a method for locking of a support ring to a scaffolding column, wherein the support ring is formed with a through opening, and wherein the support ring fits in a complementary and displaceable manner onto the scaffolding column. The invention also comprises a device for practising of the method.

Traditionally, scaffolding columns have been made from steel pipes provided with welded fasteners for support beams, bracing stays and other components known per se and constituting parts of a scaffolding system.

Steel-based scaffoldings, however, are relatively heavy to handle, and gradually scaffolding systems made from aluminium have emerged.

Frequently, scaffolding columns of aluminium are produced by means of so-called extrusion, after which they are heat-treated to a relatively high strength at the production site.

Extruded aluminium profiles have, due to their production method, a uniform cross-section along their entire length. It is therefore a challenge to find a solution to the task of affixing fittings to such a column without weakening the column during machining of e.g. openings, or during heat influence from e.g. welding.

It is known to clamp a support ring around the column. As such, NO 79351 shows a purpose-made clamp.

A clamp of this type, however, is not suitable when it comes to production of large quantities of scaffolding columns with fasteners for use in a scaffolding system.

In order to simplify the production of such scaffolding columns of aluminium, a support ring for a scaffolding column has been developed, wherein the support ring is formed with a through opening fitting in a complementary and displaceable manner to the scaffolding column. The support ring is adapted to other components constituting parts of the scaffolding system. If the support ring is affixed to the support column by means of a welded joint, this will reduce the strength of the scaffolding column significantly, as mentioned above.

The object of the invention is to remedy or reduce at least one of the disadvantages of the prior art.

The object is achieved in accordance with the invention and by virtue of the features disclosed in the following description and in the subsequent claims.

A method for locking of a support ring to a scaffolding column is provided, wherein the support ring is formed with a through opening, and wherein the support ring fits in a complementary and displaceable manner onto the scaffolding column, the method comprising:
- providing an external mantel surface of the scaffolding column with a longitudinal column track;
- providing an inner mantel of the support ring with a ring track;
- displacing a support ring along and around the scaffolding column;
- positioning the column track and the ring track next to each other; and
- displacing a thread body into the column track and the ring track during rotation of the thread body about a longitudinal axis thereof, a column track depth and a ring track depth having a collective depth being smaller than an external thread diameter of the thread body.

Thereby, the thread body cuts into the material of both the scaffolding column and the support ring and thus locks the support ring in a fixed position on the scaffolding column. The locking is carried out without weakening the scaffolding column to a substantial degree.

The method may further comprise displacing a head portion of the thread body into the column track and the ring track, the head portion having a larger cross-section than a core cross-section of the thread body.

The head portion is formed so as to be in engagement with the material in the scaffolding column and the support ring. This relatively steady engagement contributes to reduce the danger of the thread body becoming unfastened, for example due to vibration.

The method may also comprise conducting a thread body onward to the ring track by means of pressurized air, and via a feed pipe. Automated feeding from e.g. a magazine will contribute to a faster production, insofar as the time consumed per thread body may then be reduced.

The method may be practised by means of a device for locking a support ring to a scaffolding column, wherein the support ring is formed with a through opening fitting in a complementary and displaceable manner to the scaffolding column. The device is characterized in that it comprises a displaceable actuator with a rotary function, wherein the actuator is provided with a tool that fits in a complementary manner into a head portion of a thread body, and wherein the tool is directed, when in its start position, toward the head portion of the thread body, the thread body being located at an opening leading into a longitudinal column track in the scaffolding column and into a ring track in the support ring, a column track depth and a ring track depth having a collective depth being smaller than an external thread diameter of the thread body.

The actuator may be structured in a manner allowing it to displace the thread body into the column track in the scaffolding column and into the ring track in the support ring during rotation of the tool.

When the scaffolding column and the support ring are mutually locked in accordance with the invention, it is normally not possible to disassemble the connection without damaging at least one of the inbound components. The locking may thus be considered to be permanent.

The method and the device in accordance with the invention allows for a fast, simple and substantially permanent assembly of a scaffolding column and a support ring without weakening the support column to a substantial degree.

Figure 2:
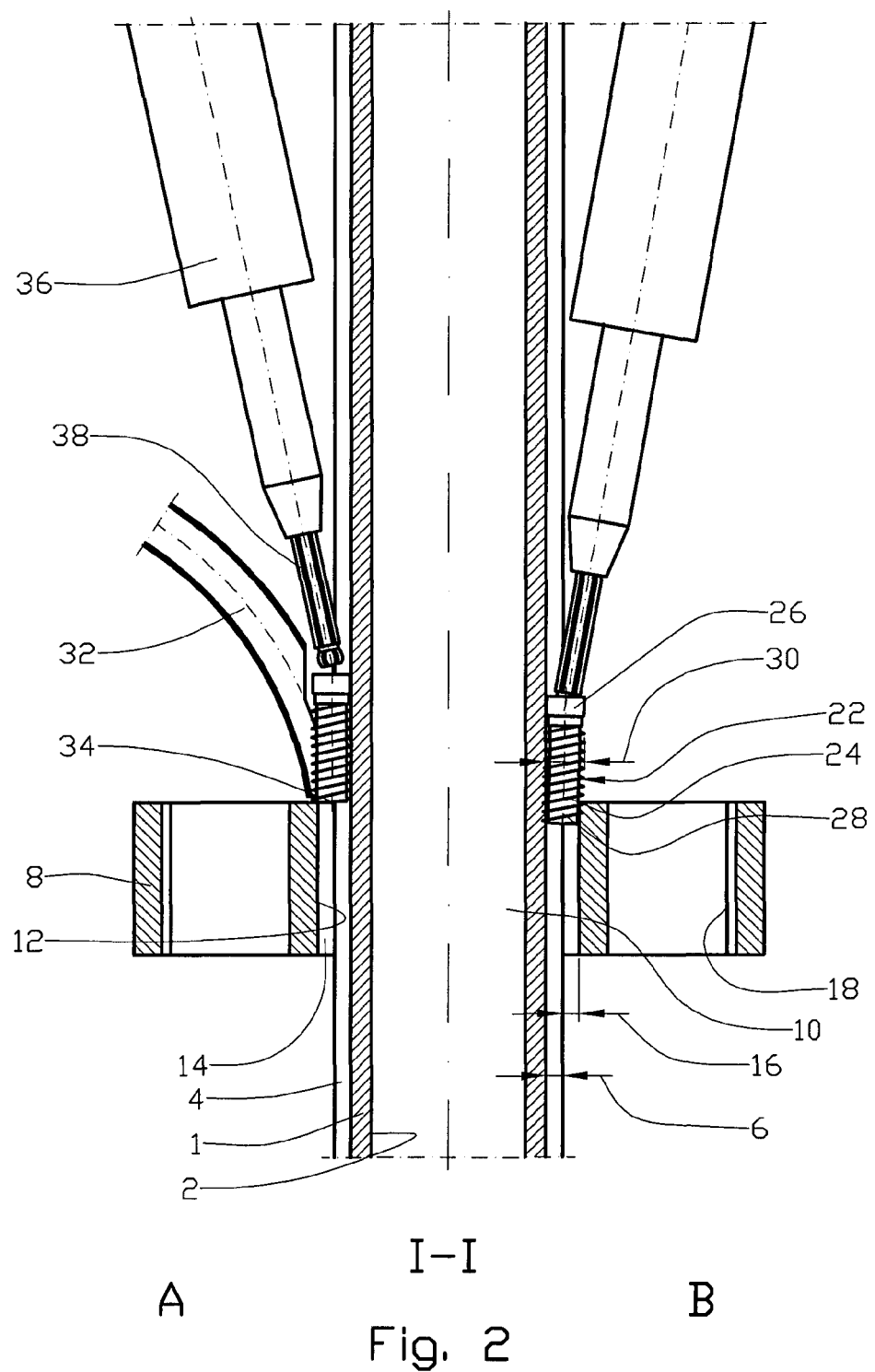
Figure 3:
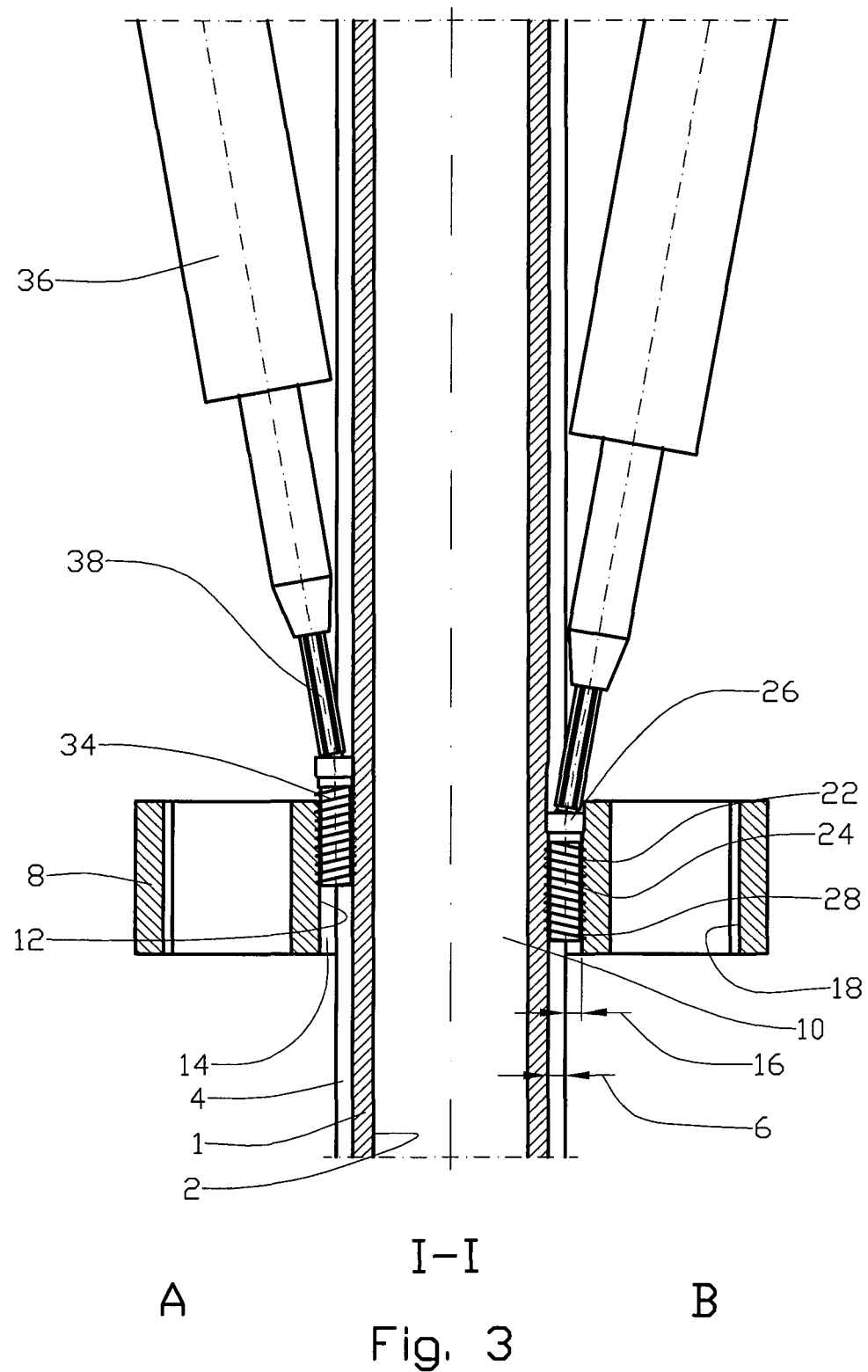

Hereinafter, an example of a preferred method and embodiment is described and is depicted in the accompanying drawings, where:

FIG. 1 shows an end view of a support ring located on a support column;

FIG. 2 shows, in section, a portion from FIG. 1 showing, at the left side marked "A", a tool being in a position for displacing a thread body into a column track and a ring track, and wherein a right side marked "B" of the figure shows a situation as it appears after the thread body has been displaced somewhat into the column track and the ring track; and FIG. 3 shows the same as in FIG. 2, but herein the left side marked "A" shows that the thread body has been displaced further inwards, whereas the right side marked "B" shows the thread body completely inserted.

In the drawings, reference numeral 1 denotes a scaffolding column being, in the embodiment shown, hollow with a corrugated, inner mantel 2. Externally the scaffolding column 1 is provided with a number, eight herein, of distributed, longitudinal column tracks 4 having a column track depth 6, see FIG. 2.

A support ring 8, which is formed with a through opening 10 having an inner mantel 12, has been displaced along and around the scaffolding column 1 and to a desired relative position. The inner mantel 12 is provided with a number, four herein, of longitudinal, distributed ring tracks 14 having a ring track depth 16.

Further, the support ring 8 is formed with a number of through mounting openings 18 for connection to other components (not shown) of a scaffolding system.

The through opening 10 of the support ring 8 fits in a complementary manner to the scaffolding column 1, where at least two ring tracks 14 fit vis-à-vis corresponding column tracks 4.

In the drawings, the column tracks 4 and the ring tracks 14 have been given a semicircular cross-section.

A thread body 22 with a thread portion 24 and a head portion 26 is structured in a manner allowing it to be displaced, by means of rotation about a longitudinal axis 28 thereof, into the column track 4 between the scaffolding column 1 and the support ring 8. An external diameter 30 of the thread portion 24 is larger than the sum of the depths 6 and 16 of the column track 4 and the ring track 14.

A feed pipe 32, see FIG. 2A, extends from a magazine (not shown) for thread bodies 22 and onward to an opening 34 formed by the column track 4 and the ring track 14 at the support ring 8.

An actuator 36 is disposed at each opening 34 into which a thread body 22 is to be displaced. The actuator 36 is provided with a tool 38 fitting in a complementary manner into the head portion 26 of the thread body 22. The tool may, for example, be comprised of an Allen- or Torx key. The actuator 36 is structured in a manner allowing it to displace the tool 38 in the direction of the thread body 22 during simultaneous, axial displacement and rotation.

In FIG. 2A, the tool 38 is shown when in position at a thread body 22. In FIG. 2B, the tool 38 is in engagement with the head portion 26. The thread body 22 is displaced somewhat into and between the scaffolding column 1 and the support ring 8.

In FIG. 3A, the thread body 22 is displaced somewhat further inwards, whereas in FIG. 3B it is located in its final position between the scaffolding column 1 and the support ring 8.

The actuator 36 then retracts the tool 38 from the thread body 22.

It is most rational for the actuator 36 to screw in all of the thread bodies 22 for the same support ring at substantially the same time.

The invention claimed is:

1. A method for locking of a support ring to a scaffolding column, wherein the support ring is formed with a through opening, and wherein the support ring fits in a complementary and displaceable manner onto the scaffolding column, the method comprising:

providing an external mantel surface of the scaffolding column with a longitudinal column track;

providing an inner mantel of the support ring with a ring track;

displacing a support ring along and around the scaffolding column;

positioning the column track and the ring track next to each other; and displacing a thread body into the column track and the ring track during rotation of the thread body about a longitudinal axis thereof, a column track depth and a ring track depth having a collective depth being smaller than an external thread diameter of the thread body.

2. The method according to claim 1, wherein the method further comprises displacing a head portion of the thread body into the column track and the ring track, the head portion having a larger cross-section than a core cross-section of the thread body.

3. The method according to claim 1, wherein the method further comprises conducting a thread body onward to the ring track by means of pressurized air, and via a feed pipe.

\* \* \* \* \*